United States Patent [19]

Laermer et al.

[11] Patent Number: 5,308,549
[45] Date of Patent: May 3, 1994

[54] STABILIZERS FOR THERMO PLASTIC MATERIALS

[75] Inventors: Stuart F. Laermer, Glen Rock; Vincent J. Rizzo, North Arlington, both of N.J.

[73] Assignee: Hoffmann-La Roche Inc., Nutley, N.J.

[21] Appl. No.: 955,000

[22] Filed: Oct. 9, 1992

Related U.S. Application Data

[63] Continuation-in-part of Ser. No. 791,744, Nov. 12, 1991, abandoned.

[51] Int. Cl.$^5$ .................. C09K 15/06; C08K 5/15; C08K 5/10; C08K 5/05
[52] U.S. Cl. ...................... 252/399; 252/407; 524/110; 524/317; 524/386; 524/389
[58] Field of Search ............... 252/399, 407; 524/110, 524/377, 378, 317, 386, 389

[56] References Cited

U.S. PATENT DOCUMENTS

| | | | |
|---|---|---|---|
| 2,535,058 | 12/1950 | Gleim et al. | 44/63 |
| 3,282,891 | 11/1966 | Bown et al. | 524/110 |
| 3,337,495 | 8/1967 | Corbett et al. | 260/45.95 |
| 3,880,805 | 4/1975 | Needham | 524/110 |
| 3,907,749 | 9/1975 | Friedrich et al. | 524/110 |
| 4,187,212 | 2/1980 | Zinke et al. | 524/110 |
| 4,348,308 | 9/1972 | Minagawa et al. | 524/110 |
| 4,404,304 | 9/1983 | Horner et al. | 524/110 |
| 4,511,685 | 4/1985 | Nissen et al. | 524/110 |
| 4,532,165 | 7/1985 | Hashimoto et al. | 524/291 |
| 4,680,327 | 7/1987 | Hettche et al. | 524/110 |
| 4,806,580 | 2/1989 | Bock et al. | 524/110 |
| 5,100,930 | 3/1992 | Fiukui et al. | 524/110 |

FOREIGN PATENT DOCUMENTS

| | | |
|---|---|---|
| 36169 | 9/1981 | European Pat. Off. . |
| 263524 | 4/1988 | European Pat. Off. . |
| 384472 | 8/1990 | European Pat. Off. . |
| 3903218 | 8/1989 | Fed. Rep. of Germany . |
| 54-20056 | 2/1979 | Japan . |
| 02102241 | 4/1990 | Japan . |
| 961480 | 6/1964 | United Kingdom . |
| 1141812 | 2/1969 | United Kingdom . |
| 2215727 | 9/1989 | United Kingdom . |
| 90/07547 | 7/1990 | World Int. Prop. O. . |

OTHER PUBLICATIONS

Patent Abstracts of Japan, vol. 3, No. 59 (C-46) of Kokai 54-34352.
Laermer, S. F., et al., Plastics and Rubber Processing and Applications, vol. 14, pp. 235-239 (1990).
Derwent Abstract of JP 54-55043.
Derwent Abstract of JP 62-86036.
Derwent Abstract of EP 384 472.
Derwent Abstract of JP 58-84839.
Derwent Abstract of EP 36 169.
Chemistry & Industry, 20 Nov. 1989.
Chemical Abstract 100(6): 35301j of JP 58-96638.
Chemical Abstract 103(20): 161374k of JP 60-112847.
Chemical Abstract 100(26): 211039r of JP 58-191733.
Chemical Abstract 107(2): 8316f of JP 62-39684.
Chemical Abstract 105(26): 227912j of CS 221404.
Laermer, S. F. et al., Use of Biological Antioxidants and Their Derivatives as Polypropylese Stabilizers, Presented at PRI International Polypropylene Conference Madrid, Nov. 1989.

(List continued on next page.)

Primary Examiner—Paul R. Michl
Assistant Examiner—Tae H. Yoon
Attorney, Agent, or Firm—George M. Gould; George W. Johnston; Alan P. Kass

[57] ABSTRACT

Stabilizing mixtures for a plastic material are disclosed. The mixture is comprised of (a) about one part by weight of a tocopherol compound; and (b) from about 1.4 to about 5.0 parts by weight of a secondary antioxidant.

6 Claims, No Drawings

OTHER PUBLICATIONS

Laermer, S. F. et al., PRI International Conference Nov. 9-10, 1989, Madrid.

Abstract of Laermer, S. F., et al., PRI International Conference, Nov. 9-10, 1989, Madrid.

Technical Information–High Performance Antioxidants EniChem Synthesis S.P.A.

Klender, G. J. et al., Society of Plastics Engineers ANTEC Proceedings, 43,989 (1985), Ethyl Corporation Technical Bulletin–Ethanox[R] Antioxidants, Dec. 16, 1983.

Ethyl Corporation Technical Bulletin–Color Suppression Additives for Polypropyle Klender, G. J. et al., Polyolefins V, Session C:Polyolefin Additives Feb., 1987.

Billingham, N.C., Comparative Antioxidant Efficiencies of BHT and Alpha-Tocophero in NR. J. Am. Oil Chemists' Soc., 33, 322 (1956).

Chemical Abstract of NE 6 413 410.

5,308,549

STABILIZERS FOR THERMO PLASTIC MATERIALS

CROSS-REFERENCE TO RELATED APPLICATION

This application is a continuation-in-part application of Ser. No. 07/791,744, filed Nov. 12, 1991, now abandoned.

BACKGROUND OF THE INVENTION

1. Field of the Invention

This invention relates to stabilizers for plastic materials, and more specifically, to stabilizing mixtures to improve the color and the processing of plastic materials.

2. Background

Reducing oxidation and stabilizing the color of polymers during processing is important to the plastics industry. Polymers, during processing into articles, are subjected to high temperatures and pressures which can have an adverse affect on the molecular weight and physical properties of the polymer and appearance of the finished articles made from these polymers. The need exists, therefore, for antioxidant and color stabilizing materials which minimize oxidization and color instability.

U.S. Pat. No. 4,806,580 discloses a stabilizer mixture for stabilizing plastic material in processing. The disclosed stabilizer mixture contains (a) a chroman derivative and (b) an organic phosphite or phosphonite in a ratio (a:b) of 1:5 to 1:14.

Japanese Patent Publication No. JP62-86036 discloses a composition containing per 100 parts by weight of a polyolefin, 0.005 to 0.5 parts by weight of a compound selected from the vitamin E group, and 0.01 to 0.5 parts by weight of a phosphite.

Japanese Patent Publication No. JP 54-55043 discloses a composition containing polyolefin and a compound from the vitamin E group and various phosphites. In Examples 1-6 thereof the ratios of vitamin E:phosphite evaluated in polypropylene were 1:1.6 and 1:3.3.

It is an object of the present invention to provide a stabilizer mixture for plastic materials which contain polyethylene to improve the processing stability and color.

SUMMARY OF THE INVENTION

A stabilizing mixture for plastic material containing polyethylene comprises:

(a) about one part by weight of a tocopherol compound; and (b) from about 1.4 to about 5 parts by weight of a phosphorus-or sulfur-containing secondary antioxidant.

Examples of such phosphorus-containing secondary antioxidants include compounds selected from the group consisting of bis(2,4-di-t-butylphenyl)pentaerythrityl diphosphite, distearylpentaerythrityl diphosphite, tris(p-nonylphenyl) phosphite, 2,2'-ethylidene-bis-(4,6-di-t-butylphenyl) fluorophosphonite, tetrakis(2,4-di-t-butylphenyl) biphenylenephosphonite, tetrakis(2,4-di-butyl(phenyl)-4,4'-biphenyl diphosphonite, and tris (2,4-di-t-butylphenyl)phosphonite.

An example of a sulfur-containing secondary antioxidant is distearylthiodipropionate.

DETAILED DESCRIPTION OF THE INVENTION

A stabilizing mixture for plastic material containing polyethylene comprises:

(a) about one part by weight of a tocopherol compound; and (b) from about 1.4 to about 5 parts by weight of a phosphorus-or sulfur-containing secondary antioxidant.

Examples of such phosphorus-containing secondary antioxidants include compounds selected from the group consisting of bis(2,4-di-t-butylphenyl)pentaerythrityl diphosphite, distearylpentaerythrityl diphosphite, tris(p-nonylphenyl) phosphite, 2,2'-ethylidene-bis-(4,6-di-t-butylphenyl) fluorophosphonite, tetrakis(2,4-di-t-butylphenyl) biphenylenephosphonite, tetrakis(2,4-di-butyl(phenyl)-4,4'-biphenyl diphosphonite, and tris (2,4-di-t-butylphenyl)phosphonite.

An example of a sulfur-containing secondary antioxidant is distearylthiodipropionate.

Mixtures of the present invention at the claimed ratios of (a):(b) of from about 1:4 to about 1:5 by weight produced improved processing stability, color stability, and heat aging stability.

As used herein, "secondary antioxidant" refers to those compounds which are hydroperoxide decomposers, that is, the ability to react with hydroperoxides to yield non-radical products, essentially decomposing hydroperoxide into stable by-products. Examples of compounds include triesters of phosphorous acids (phosphites), diesters of phosphorous acids (phosphonites) and esters of dithiodipropionic acid.

As used herein, "tocopherol compound" refers to those compounds having the basic tocopherol structure of the vitamin E family and specifically refers to alpha-tocopherol (ATP; also known as vitamin E) and gamma-tocopherol.

The phosphites and phosphonites disclosed above can be synthesized by techniques well known to those of ordinary skill in the art. Several of the phosphites and phosphonites are commercially available under the following tradenames: bis(2,4-di-t-butylphenyl)pentaerythrityl disphosphite—"Ultranox 626" from General Electric; distreaylpentaerythrityl diphosphite—"Weston 618 (or 619)" from General Electric; 2,2'-ethylidene-bis(4,6-di-t-butylphenyl)fluorophosphonite— "Ethanox 398" from Ethyl Corporation; and tetrakis(2,4-di-t-butylphenyl)-4,4'-biphenylenephosphonite— "Irgafos P-EPQ" from Ciba-Giegy.

An example of a sulfur-containing secondary antioxidant, distearyldithioproprionate or DSTDP is available under the name EVANSTAB 18 from W. R. Grace.

As used herein, plastic materials containing polyethylene refers to those plastic materials which contain only polyethylene, homopolymers, including, but not limited to high density polyethylene, low density polyethylene, linear low density polyethylene, and ultra high molecular weight polyethylene, which contain as one of the repeating units in a copolymer the polyethylene monomer moiety, or a blend of polyethylene and another polymer. Those skilled in the art will appreciate and will know how to make the different types of copolymers that can be formed with polyethylene, including alternating, block and graft copolymers as well as how to make the blends of polyethylene with other polymers.

Suitable thermoplastic materials for which the mixtures of the present invention can be employed with include, but are not limited to polyolefins, such as polyethylene and polypropylene, polyvinyl chloride, styrene polymers, and polyurethanes.

The mixture according to the invention is incorporated in a concentration of from about 0.001 to about 5%, preferably from 0.025 to 0.075%, by weight based on the plastic material to be stabilized.

The following examples serve to illustrate the present invention.

Polyethylene Formulations

Description and Scope of the Study

Formulations of high-density polyethylene (HDPE) and low-density polyethylene (LDPE) with various additives were prepared for this study. Neat, unstabilized HDPE resin was obtained from Paxon company as Paxon 8-062. Neat, unstabilized LDPE resin was obtained from Quantum Chemicals as Quantum MN722. The various additives tested were used as received from the respective suppliers. Vitamin E (ATP) was obtained from Hoffmann-La Roche Inc. The formulations are shown in Table 1 below.

Samples were prepared by dry-blending the ingredients, extrusion compounding, extrusion of thin (0.030 in.) tapes, multi-pass extrusion of samples for melt-index studies and injection molding of tensile bars (0.125 in.) and plaques (0.075 in).

Samples were oven-aged at 120° C./15 days for HDPE and 90° C./15 days for LDPE.

Sample Preparation

A. Compounding

The formulations shown in Table 1 were tumble-blended for 10 to 15 minutes on a Patterson-Kelly twin-shell dry-blender.

Extrustion compounding was performed on a Davis-Standard extruder equipped with 1½ in. diameter, general-purpose mixing screw. A 20/40 mesh screen was employed. Extrusion was through an oval 1½ × ¼ in. die. Extrusion temperatures were:

HDPE 400°–410° F. (barrel), 400° F. die
LDPE 320°–330° F. (barrel), 300° F. die

Neat resins, Paxon 8-062 and Quantum MN722, were also processed through the extruder so that all materials would have the same heat history.

After extrustion compounding, the materials were chopped using a Nelmar 10 H.P. grinder equipped with ¼ in. screens.

B. Sample Extrusion for Melt Flow Index

The extruder was equipped with a 1½ × 0.030 in. tapered die.

Extrusion conditions were:

HDPE 400° to 450° F. barrel temperature (from feed end to die), 430° F. die temperature. Speed setting at 2 (out of 6, maximum). Head pressure ranged from 1,500 to 2,000 psi.

LDPE 320° to 350° F. barrel temperature, no heat on die. Speed setting at 2. Head pressure ranged from 600 to 1,200 psi.

The material was cut into ¼ to ½ in. pieces for the multi-pass extrusion study.

C. Multi-pass Extrusion

A portion of each material formulation was sequentially passed through the extruder four more times (total of five) under the same conditions noted above. Samples were taken after 1, 3 and 5 passes for melt-index studies and for color comparison. The latter samples were mounted on a white background for color comparison by eye.

D. Injection Molding

The injection molding of test samples was performed on a New Britain 75-ton, reciprocating-screw machine equipped with a general-purpose screw. A standard ASTM test mold was used producing tensile "dog-bone" bars at 0.125 in. thickness and 1 ½ in. × 5 in. × 0.075 in. plaques. Molding conditions follow:

HDPE 475° F. barrel temperature. 18-second pressure-hold interval. 18-second cooling interval. Total ram travel 3 ½ in. Mold at room temperature.

LDPE 350° F. barrel temperature. 7-second pressure-hold interval. 18-second cooling interval. 2 ½ in. total ram travel.

Testing

A. Melt Index After Multi-Pass Extrusion

Melt index determinations on HDPE were performed in accordance with ASTM D1238, condition L. The conditions were modified upon instructions from the material vendor to: 230° C., 22,600 gm. weight. For LDPE, condition E was followed, 190° C., 2,160 gm. weight.

Three separate sample determinations were made for each HDPE and LDPE formulation subjected to five extruder passes. Melt index was determined for each after the first, third and fifth pass. It was observed that no significant melt-index change occurred by multi-processing the LDPE. All LDPE formulations were heat-aged for one hour at 450° F. in a capillary extruder and tested for melt index and optically compared for color.

B. Testing for Yellowness Index

Both 0.125 in. and 0.075 in. thick samples were tested for yellowness index in accordance to ASTM D1925. A MacBeth spectrophotometer Model 1500 was employed for these measurements. A standard magnesium oxide plaque was used for the color measurements both as a calibration standard and as a background to the samples as prescribed in the ASTM test method. CIE light-source C was used for the yellowness-index measurements. Readings were made at the prescribed 2-degree "observer" angle. Five 0.125 in. samples and three 0.075 in. samples were tested at zero and at 5-day intervals up to 30 days.

TABLE 1

| | | Melt Flow Index and Yellowness Index HDPE and LDPE | | | | | | | | | | | |
|---|---|---|---|---|---|---|---|---|---|---|---|---|---|
| | | MELT FLOW INDEX (MFI) | | | YELLOWNESS INDEX (YI) (120 deg C.) | | | | | | | | |
| | | | | | .125 in | | | | .075 in | | | | |
| in HDPE | ppm | MFI 1st | MFI 3rd | MFI 5th | YI 0 | YI 5 | YI 10 | YI 15 | YI 0 | YI 5 | YI 10 | YI 15 | days |
| ATP[1] | 250 | 3.6 | 2.2 | 2.1 | 1.9 | 11.0 | 12.9 | 14.3 | 18.9 | 34.5 | 36.3 | 39.3 | |
| ATP | 100 | 2.3 | 2.3 | 2.7 | 2.6 | 7.7 | 9.4 | 10.4 | 16.2 | 29.8 | 33.2 | 34.7 | |
| 11076[2] | 750 | 3.2 | 2.3 | 2.5 | −3.1 | 1.0 | 3.3 | 4.7 | 10.2 | 20.1 | 23.0 | 24.5 | |
| 11010[3] | 500 | 2.4 | 2.3 | 2.4 | −0.7 | 1.5 | 3.6 | 4.6 | 12.5 | 21.4 | 22.8 | 23.8 | |
| BHT[4] | 500 | 3.2 | 2.1 | 2.5 | 1.6 | 3.3 | 4.3 | 4.6 | 14.2 | 24.6 | 27.1 | 27.4 | |

TABLE 1-continued

Melt Flow Index and Yellowness Index HDPE and LDPE

| | | | | | | | | | | | |
|---|---|---|---|---|---|---|---|---|---|---|---|
| 202C[10] | 2500 | 2.2 | 2.1 | 2.1 | −8.9 | 0.2 | 3.6 | 2.9 | 1.3 | 21.5 | 24.6 | 23.9 |
| UNSTABILIZED | | 2.7 | 0.9 | 1.7 | 1.9 | 3.2 | 4.6 | 2.1 | 0.5 | 1.7 | 1.8 | 2.5 |
| ATP 250/DSTDP[5] 500[6] | | 4.1 | 3.5 | 2.9 | 7.9 | 12.4 | 14.8 | 16.2 | 24.0 | 33.7 | 36.0 | 37.2 |
| ATP 100/DSTDP5 500 | | 3.4 | 2.5 | 2.1 | 4.2 | 8.1 | 9.9 | 11.1 | 14.7 | 29.2 | 31.9 | 33.0 |
| I1076 750/DSTDP 500 | | 2.2 | 2.8 | 2.8 | −2.2 | 2.0 | 4.4 | 6.2 | 12.6 | 21.0 | 23.9 | 26.4 |
| I1010 500/DSTDP 500 | | 2.2 | 2.0 | 2.3 | 2.4 | 7.4 | 9.4 | 11.0 | 18.6 | 29.2 | 31.7 | 34.4 |
| ATP 250/U626[7] 350 | | 2.6 | 2.3 | 2.7 | −6.4 | 1.8 | 5.7 | 7.8 | 9.2 | 21.4 | 25.3 | 27.7 |
| ATP 100/U626 350 | | 2.2 | 2.4 | 2.5 | −3.3 | 3.7 | 5.9 | 7.6 | 11.1 | 22.2 | 25.0 | 26.7 |
| I1010 500/U626 350 | | 2.4 | 2.3 | 3.0 | −7.9 | −2.1 | 0.7 | 2.4 | 6.8 | 17.8 | 21.3 | 23.6 |
| ATP 250/I168[8] 500 | | 4.4 | 2.8 | 2.4 | 3.6 | 10.2 | 12.9 | 14.1 | 19.3 | 30.9 | 33.9 | 35.2 |
| ATP 100/I168 500 | | 4.0 | 2.3 | 2.1 | 1.1 | 7.2 | 8.9 | 9.9 | 16.3 | 25.3 | 27.8 | 29.1 |
| I1010 500/I168 1000 | | 3.3 | 2.2 | 2.1 | 1.0 | 8.7 | 11.6 | 13.6 | 15.6 | 27.8 | 31.3 | 34.1 |

| | | MELT FLOW INDEX (MFI) | | | YELLOWNESS INDEX (YI) (120 deg C.) (0.0804 in) | | | |
|---|---|---|---|---|---|---|---|---|
| in HDPE | ppm | MFI 1st | MFI 3rd | MFI 5th | YI 1st | YI 3rd | YI 5th | passes |
| 202C | 1000 | 1.5 | 1.6 | 1.6 | −1.5 | 0.1 | 1.7 | |
| 202C | 1500 | 1.6 | 1.6 | 1.5 | −1.7 | −0.1 | 1.6 | |
| 202C | 2000 | 1.6 | 1.5 | 1.5 | −1.0 | 1.9 | 3.5 | |
| 202C-7 | 600 | 1.5 | 0.8 | 0.6 | −1.5 | −0.5 | −0.4 | |
| 202C-10 | 750 | 1.6 | 1.5 | 1.5 | −2.0 | −1.4 | −0.6 | |
| 202D | 300 | 1.5 | 0.8 | 0.6 | 1.0 | 1.5 | 2.1 | |
| 202F | 300 | 1.5 | 1.4 | 1.0 | −0.2 | 1.4 | 2.3 | |

| | | | YELLOWNESS INDEX (90 deg. C.) | | | | | | |
|---|---|---|---|---|---|---|---|---|---|
| | | | .125 in | | | | .075 in | | | |
| in LDPE | MFI Unaged | MFI 1 hr. 450 F. | YI 0 | YI 5 | YI 10 | YI 15 | YI 0 | YI 5 | YI 10 | YI 15 | days |
| ATP 100 | 5.1 | 4.6 | 3.3 | 1.5 | 1.4 | 1.6 | 1.3 | 1.7 | 1.8 | 2.1 | |
| I1076 500 | 5.1 | 4.7 | 2.9 | 1.8 | 1.7 | 2.0 | 0.5 | 0.3 | 0.4 | 0.5 | |
| BHT 500 | 5.1 | 4.7 | 3.3 | 1.8 | 1.7 | 2.0 | 0.3 | 0.4 | 0.6 | 0.7 | |
| 202C 2500 | 5.1 | 4.7 | −9.6 | −7.8 | −7.5 | 6.9 | 3.6 | 7.9 | 14.2 | 33.5 | |
| UNSTABILIZED | 5.1 | 3.4 | 3.6 | 3.2 | 4.2 | 1.8 | 0.8 | 0.9 | 0.8 | 0.7 | |
| ATP 100/TNPP[9] 500 | 5.1 | 4.9 | 3.0 | 2.6 | 2.3 | 2.2 | 0.6 | 0.7 | 0.9 | 1.0 | |
| I1076 500/TNPP 500 | 5.1 | 4.8 | 2.7 | 1.8 | 1.4 | 1.6 | −0.2 | −0.2 | −0.5 | 0.1 | |
| BHT 500/TNPP 500 | 5.1 | 4.8 | 2.8 | 1.9 | 1.7 | 1.7 | −0.1 | 0.0 | −0.2 | 0.1 | |
| ATP 100/I168 500 | 5.0 | 5.0 | 3.0 | 1.8 | 1.4 | 1.9 | 0.2 | 0.3 | 0.5 | 0.7 | |
| I1076 250/I168 1000 | 5.1 | 4.7 | 2.7 | 0.7 | 0.8 | 0.6 | 0.4 | 0.2 | 0.3 | 0.4 | |

[1] ATP: d,l-alpha-tocopherol
[2] Irganox 1076 [stearyl-β-(3,5-ditert-butyl-4-hydroxypheny)propionate]
[3] Irganox 1010 [pentaerythrityltetrakis(3,5-ditert-butyl-4-hydroxy phenyl)propionate]
[4] Butylated hydroxytoluene [2,6-ditertbutyl-para-cresol]
[5] distearylthiodipropionate
[6] mixtures of additive in ppm of each additive in HDPE or LDPE evaluated
[7] Ultranox 626 [Bis-(2,4-di-t-butylphenyl)-pentaerythritol diphosphite]
[8] Irgafos 168 [Tris (2,4-ditert-butylphenyl)phosphite]
[9] tris-paranonyl-phenyl phosphite
[10] 202C (% w/w) ATP: 10; glycerin: 20; PEG-300 (polyethylene glycol): 20; GMC-8 (glycerol monocaprylate caprate; available from Drew Chemical Co.):50
[11] 202C-7 (% w/w) ATP: 26; glycerin: 16; PEG-300 (polyethylene glycol): 16; GMC-8 (glycerol monocaprylate caprate; available from Drew Chemical Co.):42
[12] 202C-10 (% w/w) ATP: 20; glycerin: 20; PEG-300 (polyethylene glycol): 17; GMC-8 (glycerol monocaprylate caprate; available from Drew Chemical Co.):43
[13] 202D (% w/w) ATP: 50; GMC-8 (glycerol monocaprylate caprate; available from Drew Chemical Co.):50
[14] 202F (% w/w) ATP: 50; PEG-300 (polyethylene glycol): 50

In addition, applicants have found 202C[a], 202C-7[b], 202C-10[c], 202D[d], and 202F[e] to be novel formulations as plastic stabilizers. The formulations are clear solutions and remain so even after being frozen and then thawed. The formulations (% w/w) appear below.

| Ingredient | 202C | 202C-7 | 202C-10 | 202D | 202F |
|---|---|---|---|---|---|
| alpha-tocopherol | 10 | 26 | 20 | 50 | 50 |
| glycerin | 20 | 16 | 20 | | |
| PEG-300[a] | 20 | 16 | 17 | | 50 |
| GMC-8[a] | 50 | 42 | 43 | 50 | |
| | 100 | 100 | 100 | 100 | 100 |

[a] See note [10] of Table 1
[b] See note [11] of Table 1
[c] See note [12] of Table 1
[d] See note [13] of Table 1
[e] See note [14] of Table 1

The formulations are made by placing the ingredients in a suitable container and stirring until clear.

The use of 202C, 202C-7, 202C-10, 202D, and 202F as stabilizers are shown in the aforementioned Table 1.

Thus, envisioned formulations include those where alpha-tocopherol, glycerin, PEG-300, and GMC-8 are within the following ranges (% w/w): alpha-tocopherol from about 10 to about 50; glycerin from about 0 to about 20; PEG-300 from about 0 to about 50; and GMC-8 from about 0 to about 50.

We claim:

1. A mixture for stabilizing a plastic material comprising:
   a) from about 10 to about 50 percent by weight alpha-tocopherol;
   b) from about 16 to about 20 percent by weight glycerin;
   c) from about 16 to about 50 percent by weight PEG-300; and
   d) from about 42 to about 50 percent by weight glyceryl monocaprylate-caprate.

2. The mixture of claim 1 comprising:
a) about 10 percent by weight alpha-tocopherol;
b) about 20 percent by weight of glycerin;
c) about 20 percent by weight of PEG-300; and
d) about 50 percent by weight glyceryl monocaprylate-caprate.

3. The mixture of claim 1 comprising:
a) about 20 percent by weight alpha-tocopherol;
b) about 20 percent by weight of glycerin;
c) about 17 percent by weight of PEG-300; and
d) about 43 percent by weight glyceryl monocaprylate-caprate.

4. The mixture of claim 1 comprising:
a) about 26 percent by weight alpha-tocopherol;
b) about 16 percent by weight of glycerin;
c) about 16 percent by weight of PEG-300; and
d) about 42 percent by weight glyceryl monocaprylate-caprate.

5. A mixture for stabilizing a plastic material comprising:
a) about 50 percent by weight alpha-tocopherol; and
b) about 50 percent by weight glyceryl monocaprylate-caprate.

6. A mixture for stabilizing a plastic material comprising:
a) about 50 percent by weight alpha-tocopherol; and
b) about 50 percent by weight PEG-300.

* * * * *